(12) United States Patent
Khaleghi et al.

(10) Patent No.: US 10,225,016 B1
(45) Date of Patent: Mar. 5, 2019

(54) OPTICAL POWER AND CHROMATIC DISPERSION EQUALIZATION SYSTEM

(71) Applicant: Amazon Technologies, Inc., Seattle, WA (US)

(72) Inventors: Salman Khaleghi, Seattle, WA (US); Emily Abbess, Seattle, WA (US); Christopher Rodenchuk, Seattle, WA (US); Alaa Adel Mahdi Hayder, Seattle, WA (US); Robert Harrison, Dublin (IE); Matt Connolly, Dublin (IE)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/195,983

(22) Filed: Jun. 28, 2016

(51) Int. Cl.
- *H04B 10/079* (2013.01)
- *H04B 10/2513* (2013.01)
- *H04J 14/02* (2006.01)

(52) U.S. Cl.
CPC . *H04B 10/25133* (2013.01); *H04B 10/07951* (2013.01); *H04J 14/02* (2013.01); *H04B 2210/258* (2013.01)

(58) Field of Classification Search
CPC ...... H04B 10/2507; H04B 10/2513–10/25133; H04B 2210/258
See application file for complete search history.

(56) References Cited

U.S. PATENT DOCUMENTS

| | | | | |
|---|---|---|---|---|
| 5,825,521 A | * | 10/1998 | Ogawa | H04B 10/07953 398/158 |
| 6,181,449 B1 | * | 1/2001 | Taga | H04B 10/25073 385/24 |
| 6,879,426 B1 | * | 4/2005 | Weiner | G02F 1/13471 359/279 |
| 2001/0022676 A1 | * | 9/2001 | Ishikawa | G02B 6/29377 398/82 |
| 2002/0089724 A1 | * | 7/2002 | Nishimoto | H04B 10/25133 398/158 |
| 2006/0067611 A1 | | 3/2006 | Frisken et al. | |
| 2006/0067699 A1 | * | 3/2006 | Chandrasekhar | H04B 10/2513 398/147 |

(Continued)

OTHER PUBLICATIONS

Bhoja et al., "PAM Modulation for 400G SMF," *IEEE*, 18 pages (May 2014).

(Continued)

*Primary Examiner* — Casey L Kretzer
(74) *Attorney, Agent, or Firm* — Klarquist Sparkman, LLP (57) ABSTRACT

Wavelength multiplexed optical communication systems include a channeled chromatic dispersion compensator coupled to receive modulated optical beams associated with a plurality of optical channels at respective communication wavelengths. The channeled chromatic dispersion compensator applies independently selected dispersion compensations to each of the optical channels by identifying a dispersion compensation associated with a preferred bit error rate, inter-symbol interference, or other signal quality metric, or determined using optical fiber properties such as dispersion slope and zero dispersion wavelength. Chromatic dispersion compensation can be coupled with channel power equalization, and can be performed at a receiver or a transmitter or in the middle of a fiber span.

22 Claims, 8 Drawing Sheets

(56) References Cited

U.S. PATENT DOCUMENTS

| | | | |
|---|---|---|---|
| 2009/0110390 A1* | 4/2009 | Tosetti | H04B 10/0775 |
| | | | 398/16 |
| 2010/0135663 A1* | 6/2010 | Nakashima | H04B 10/299 |
| | | | 398/79 |
| 2013/0070326 A1 | 3/2013 | Frisken et al. | |
| 2014/0079111 A1* | 3/2014 | Hui | H04L 25/03044 |
| | | | 375/234 |

OTHER PUBLICATIONS

Finisar, "Flexgrid High Resolution Optical Channel Monitor (OCM) FOCM01FXC1MN," Product Brief, 2 pages (2015).

Finisar, "WaveShaper Family of Programmable Optical Processors," Product Guide, 12 pages (2015).

Lim et al., "A Study on LCoS-Based Remote Nodes for 60 GHz Fiber-Wireless Links," *IEEE*, 8 pages (2011).

Ooba et al., "Channelized Tunable Dispersion Compensator Consisting of Arrayed-Waveguide Grating and Liquid Crystal on Silicon," *NTT Technical Review*, 7:1-7 (Dec. 2009).

Schröder et al., "An optical FPGA: Reconfigurable simultaneous multi-output spectral pulse-shaping for linear optical processing," *Optics Express*, 21:690-697 (Jan. 2013).

Weiner et al., "Programmable femtosecond pulse shaping by use of a multielement liquid-crystal phase modulator," *Optics Letters*, 15:326-328 (Mar. 1990).

\* cited by examiner

OPTICAL POWER AND CHROMATIC DISPERSION EQUALIZATION SYSTEM

BACKGROUND

High speed data links can use optical fibers to communicate optical data signals over significant distances with low signal loss. Single mode optical fibers having losses of less than 0.20 dB/km at wavelengths near 1550 nm are typical, and optical transmitters and receivers are readily available that can be simply coupled to optical fibers. Such low losses have led to the implementation of optical fiber based communication systems in data center communications.

To take advantage of the high bandwidths available with optical fiber links, so-called coherent communication systems have been developed that encode data onto amplitude, phase and polarization of an optical beam in a dense wavelength division multiplexing (DWDM) technique and achieve per wavelength data rates of 10 Gbit/s and higher. Such systems typically use dual polarization-quadrature phase shift keying (DP-QPSK) modulation and coherent optical detection. Higher order quadrature amplitude modulation (QAM) formats have also been used with coherent detection.

Other approaches for high speed data communication on optical fibers use direct detection. One problem in direct-detection systems for use in DWDM is fiber chromatic dispersion (CD) and fiber nonlinearities that can cause interference and channel degradation and limit communication distances. As data rates increase, both signal bandwidth and modulation format can produce increased optical signal bandwidth, increasing the likelihood of signal degradation due to CD. Multi-level pulse-amplitude-modulation (PAM) formats have been proposed for high data rate data center applications. In such PAM modulation, optical power is modulated to multiple levels with each level representing multiple bits. These systems can be cost-effective and are promising candidates for metro-reach applications. However, in multi-level PAM systems, signal levels are typically much closer to each other than in simple on-off keying (OOK) systems, and are significantly more prone to errors produced by CD and fiber nonlinearities. Even though some tunable CD compensators are available for fiber CD compensation on DWDM channels, conventional tunable CD compensators typically exhibit multiple deficiencies: (i) CD inaccuracies remain over all channels as CD cannot be individually compensated on a per-channel basis, (ii) fixed channel frequency grids are required, limiting the channel plan, and (iii) limited CD compensation resulting in communication bandwidth limitations.

DETAILED DESCRIPTION

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In some examples, values, procedures, or apparatus are referred to as "lowest," "best," "minimum," or the like. It will be appreciated that such descriptions are intended to indicate that a selection among many useful functional alternatives can be made, and such selections need not be better, smaller, or otherwise preferable to other selections.

As used herein, "optical beam" or "beam" refers to propagating electromagnetic radiation, typically at wavelengths between about 200 nm and 2 µm. In most practical examples, beam wavelengths are between 700 nm and 1700 nm. In some examples, beam wavelengths are at or near 1550 nm and correspond to wavelengths used in wavelength division multiplexed (WDM) communication systems or so-call dense WDM (DWDM) systems. At least some of the disclosed embodiments can also be used with coarse wavelength division multiplexing (CWDM) systems, in which case the beam wavelengths may be about 1310 nm. CWDM systems may be particularly useful for short-reach applications (e.g., on the order of tens or hundreds of meters, such as within a data center). Although not specifically noted in the following, beam propagation is largely confined to optical waveguides such as optical fibers, silica-on-silicon waveguides, or waveguides in GaAs, InGaAs or other materials. "Fiber link" refers to a length of optical fiber that couples a transmitter and a receiver that are not located at the same place. Optical beams at different wavelengths define different wavelength channels, referred to herein also simply as "channels" or "optical channels." While channels are associated with a specific wavelength such as a center wavelengths, the associated optical beams also have spectral widths selected to control channel overlap. Typically, an optical beam associated with a particular wavelength can be modulated, transmitted, and detected independently of other wavelengths (channels) in a multi-channel beam. As used herein, a "channeled dispersion compensator" refers to a dispersion compensator that can independently apply chromatic dispersion compensation to each of a plurality of channels. In some disclosed examples, phase- and amplitude-programmable filters based on liquid-crystal-on-silicon (LCoS) devices are used as channeled dispersion compensators. Such dispersion compensation can generally be applied at a transmitter, a receiver, or at both a transmitter and a receiver. The amount of CD compensation required is typically based on an optical fiber type and length that is used to transport modulated optical beams. CD compensation does not require elimination of pulse spreading due to CD, but is generally associated with a reduction sufficient to achieve an intended bit error rate or otherwise achieve acceptable performance. Such dispersion compensators are also referred to herein as "channeled optical filters," and can provide CD compensation and optical power equalization independently for multiple channels.

In some examples, transmitted or received optical signals are monitored for power and center wavelength using one or more optical switches to selectively direct transmitter or received beam portions to an optical performance monitor (OPM). While the disclosed methods and apparatus can be used in a variety of optical communication systems, in one example, the disclosed approaches can be used in data center communications such as those using 4-level pulse amplitude (PAM-4) optical beam modulation. Interconnection lengths in such systems are generally less than 120 km, but shorter or longer lengths can be used. The disclosed methods, apparatus, and systems can be used with other modulation formats and other optical fiber communication systems in which spectral shaping, chromatic dispersion compensation, and channel monitoring are desired.

PAM-4 based WDM or DWDM optical fiber communication systems tend to produce relatively large signal bandwidths and thus have relatively large pulse spreading and distortion due to chromatic dispersion (CD) in optical fibers. The disclosed approaches can independently compensate CD, change channel power, and monitor power for every wavelength channel. The disclosed approaches are vendor-agnostic in that they can be implemented in any system made by any vendor, offer per-channel amplitude control that can reduce fiber nonlinearities, and permit channel power monitoring of both transmit and receive signals.

Optical devices that combine inputs at a plurality of wavelengths so as to propagate on a single fiber are referred to herein as multiplexers or optical multiplexers. These optical multiplexers also divide combined multi-channel beams into individual, separate modulated optical beams and can alternatively be referred to as demultiplexers. Modulated optical beams are occasionally referred to as optical signals. In addition, in the illustrated examples, communication systems that include transceivers are shown for convenient illustration, instead of showing transmitters and receivers independently.

Figure 1:
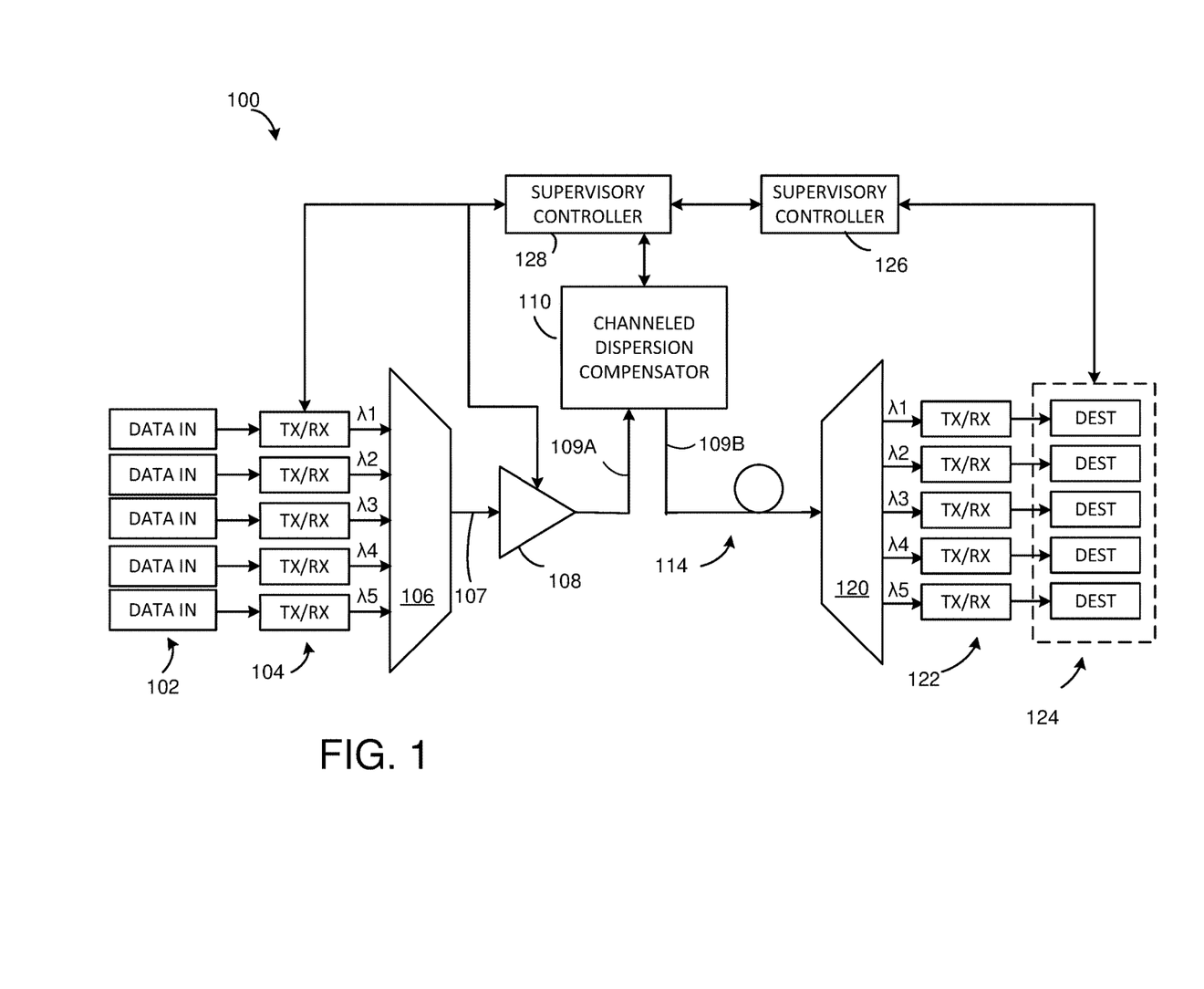
FIG. 1 illustrates a representative wavelength-multiplexed optical communication system that provides independent chromatic dispersion (CD) compensation and power equalization for each channel.

Referring to FIG. 1, an optical communication system 100 includes a plurality of optical transceivers (TX/RX) 104 that are coupled to respective data sources 102. The transceivers 104 produce corresponding modulated optical beams responsive to the corresponding data sources 102 at respective wavelengths $\lambda 1, \lambda 2, \lambda 3, \lambda 4, \lambda 5$. In the example of FIG. 1, five transceivers are illustrated, but more or fewer can be used. The wavelengths $\lambda 1, \lambda 2, \lambda 3, \lambda 4, \lambda 5$ are generally spaced so that communications at each wavelength can be conducted independently of the other wavelengths. Wavelength or "channel" spacings can be those associated with, for example, wavelength division multiplex (WDM) communication or dense wavelength division multiplex (DWDM) communication. In some examples, optical beams at wavelengths near 1550 nm (about 193 THz) are separated by about 0.8 nm, 0.4 nm, 0.2 nm, or other spacings.

Each of the transceivers 104 typically comprises a transmitter that includes a laser diode such as a distributed feedback laser or a distributed Bragg reflector laser, and a receiver that includes a photodiode. In addition, a laser monitor photodiode is generally provided as well as thermoelectric devices for use in temperature stabilization to maintain a laser diode output wavelength or to adjust an output wavelength.

An optical multiplexer 106 receives modulated optical beams at each of the wavelengths and produces a combined beam that is output at 107, typically as coupled to an optical fiber. An optical amplifier 108 receives the combined beam from the optical multiplexer 106 and couples the amplified combined beam to a channeled dispersion compensation system 110 via an optical fiber 109A. A dispersion compensated combined beam is then coupled to an optical fiber 109B and then to a fiber link 114 that can connect remote sites, including sites that are a few or many kilometers apart. A multiplexer 120 separates the wavelength components of the combined beam and delivers the components to corresponding transceivers 122. As shown in FIG. 1, the transceivers 122 are coupled to respective data destinations 124, but each transceiver can include circuitry for estimation of error rates, and a bit error rate tester (BERT) can be coupled to only one or a few transmitters at any one time. In this example, one or more or all of the data destinations 124 are electrically coupled to a supervisory communication channel that includes supervisory control systems 126, 128 that can communicate bit error rates, inter-symbol interference or other signal quality metrics, optical powers, optical modulation formats and rates, optical wavelengths and other parameters for control of communication between the transceivers 104, 122. The supervisory channel can be implemented as a separate optical or electrical channel, or as a logical channel that is communicated by some or all of the transceivers 104, 122 via the fiber 114. Bit error rates and inter-symbol interference are convenient signal quality metrics for assessing CD and power equalization, but other signal quality metrics can be used. The supervisor control system 128 is also coupled to the optical amplifier 108 so as to adjust gain or otherwise set or monitor optical amplifier operating conditions.

The channeled dispersion compensation system 110 applies independent dispersion compensations to each of the wavelength components (λ1, λ2, λ3, λ4, λ5). In some examples, a range of dispersion compensations is selected for a particular wavelength component and associated bit error rates (or other signal quality metrics) are communicated from the data destinations 124 over the supervisory channel, and a dispersion compensation setting associated with a lower (or lowest) bit error rate is selected for use. Each of the wavelength components can be evaluated in the same way, and suitable dispersion compensation values can be established for each. In additional examples, power in each of the channels is adjusted as well to provide channel power equalization.

It is generally more convenient to apply dispersion compensation to individual wavelength components after amplification and prior to transmission over the fiber link 114, but the optical communication system 100 can also be arranged so that modulated optical signals originating at the transceivers 104 are dispersion compensated prior to amplification by the amplifier 108. Alternatively, the channeled dispersion compensation system 110 can be situated between the fiber link 114 and the multiplexer 120 so that CD compensation is applied to the received optical beams. In yet other examples, one or more wavelength channels can be compensated partially at both at transmission and at reception, or individual channels can be selected for compensated before, after, or both before and after transmission via the fiber link 114, or at an intermediate location on the fiber link 114.

Figure 2:
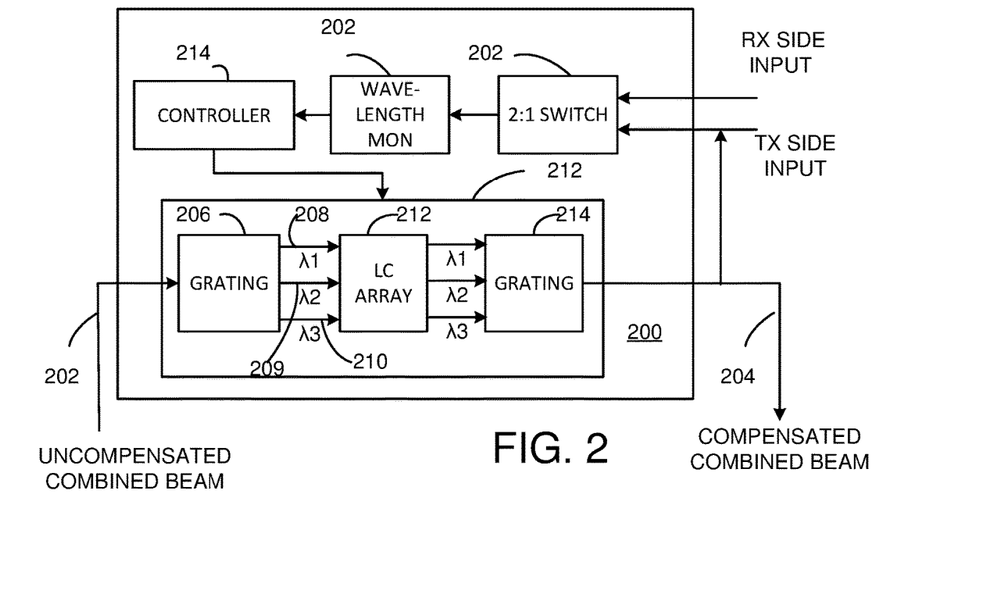
FIG. 2 illustrates a representative channeled CD compensation system.

Referring to FIG. 2, a representative channeled dispersion compensation system 200 includes an input port 202 that is coupled to receive a CD-uncompensated, combined wavelength beam and an output port 204 that delivers a CD-compensated combined beam to a fiber link. Typically, the input port 202 and the output port 204 are provided as optical fibers. A diffraction grating, an arrayed waveguide grating, wavelength selective filters, prism assemblies or other wavelength separator 206 receives an input beam from the input port 202 and produces spatially separated output beam portions 208-210 at respective wavelengths λ1, λ2, λ3. Typically, each of these wavelengths corresponds to a single channel and a corresponding modulated optical beam associated with an assigned data stream. Three wavelength portions are shown for convenient illustration, but fewer or more are possible.

A phase (and/or amplitude) modulator 212 receives the beam portions 208-210 and applies independently selectable phase (and amplitude) modulations and modulation profiles to each based on electrical drive signals provided by a controller 214. The phase modulator 212 includes an array of electrically switchable beam modulation elements defined by a liquid crystal (LC) layer situated between suitable patterned conductive electrodes. The controller 214 establishes element drive signals (typically as drive voltages) that produce selected spatially varying phases for element sets associated with each of the beam portions 208-210 so as to compensate chromatic dispersion. Each wavelength beam is typically spread over several elements. After compensation, the beam portions 208-210 are coupled to a diffraction grating 214 and then coupled into the output port 204.

Figure 3:
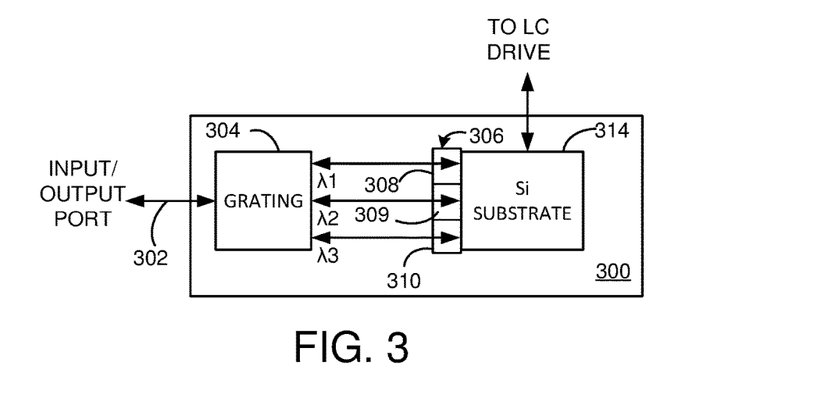
FIG. 3 illustrates a channeled CD compensator.

Although beam propagation in the wavelength selectable phase modulator 212 of FIG. 2 is shown as transmitted, in typical implementations, an LC array is situated on a silicon substrate, and input beams are reflected back through the LC array to an input grating. In this case, the input and output ports can be associated with the same or different optical fibers. Referring to FIG. 3, a channeled dispersion compensator 300 includes an input/output port 302 that directs an input optical beam to a grating 304 so that the input optical beam is separated into independently data modulated beams at wavelengths λ1, λ2, λ3 that are directed to corresponding areas 308, 309, 310 of a liquid crystal optical modulator (LCOM) 306. The LCOM 306 comprises a one or two dimensional array of modulator elements so that a selected modulation can be applied to each of the beams associated with the different wavelengths to provide dispersion compensation. The LCOM 306 is generally situated on a silicon substrate 314 in which some conductors and some circuit elements used in driving the modulator elements are defined. In the example of FIG. 3, beam portions are reflected toward the input/output port 302. An optical circulator (not shown in FIG. 3) can be used to separate these counter-propagating beams.

Figure 4:
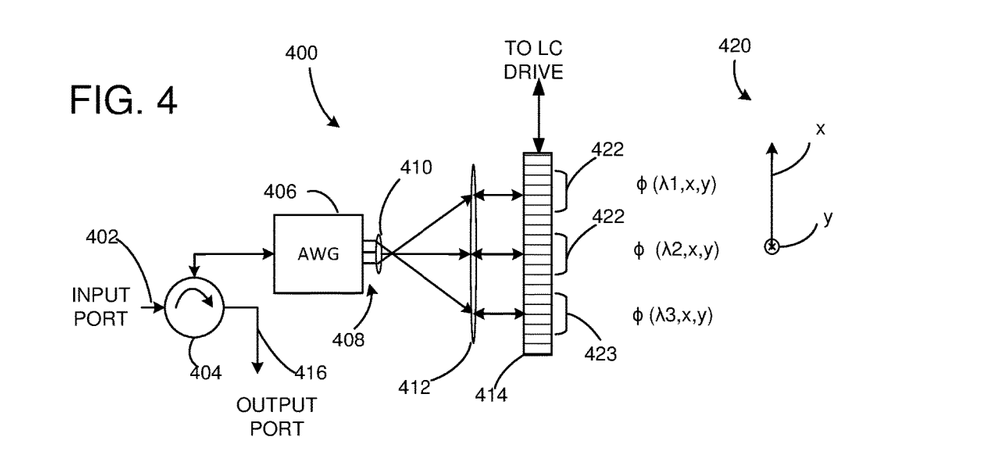
FIG. 4 illustrates a channeled CD compensator that includes an arrayed waveguide grating.

Beam separation can also be produced with wavelength dependent devices such as an arrayed waveguide grating (AWG) as illustrated in FIG. 4. A wavelength selectable phase/amplitude modulator 400 includes an input port 402 that directs an input optical beam to an optical circulator 404 and then to an AWG 406 so that the input optical beam is separated into independently data modulated beams at wavelengths λ1, λ2, λ3 that are output at corresponding fibers of a set 408 of output fibers. The optical beams from the set of fibers 408 are collimated and focused with lenses 410, 412 to a liquid crystal on silicon (LCOS) modulator 414. The LCOS modulator 414 comprises a one or two dimensional array of modulator elements so that a selected modulation can be applied to each of the beams associated with the different wavelengths to provide dispersion compensation. In the example of FIG. 4, spatially varying phases $\phi(\lambda 1,x,y)$, $\phi(\lambda 2,x,y)$, $\phi(\lambda 3,x,y)$ are applied to beams at wavelengths λ1, λ2, λ3, respectively, wherein x is a coordinate in coordinate system 420 along an axis parallel to a direction along which the beams are separated by wavelength on the LCOS modulator 414 and y is a coordinate along an axis perpendicular to the x-axis. Phases applied by the LCOS modulator as a function of coordinates x, y are associated with selected CD compensations and power equalizations. In FIG. 4, a y-axis is perpendicular to the plane of the drawing. Spatially varying phases can be programmed to apply arbitrary amplitude equalization and phase compensation on the optical channels. As shown, the beams are dispersion compensated as returned to the AWG 406 and to the optical circulator 404 that provides a dispersion compensated combined beam at an output 416.

Figure 5:
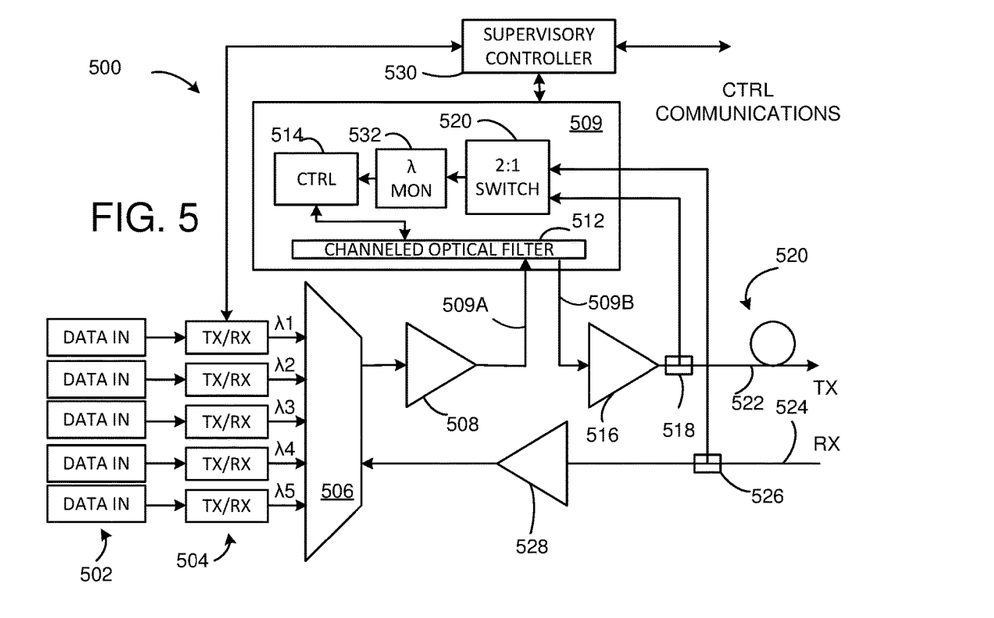
FIG. 5 illustrates a representative optical communication system that includes channeled dispersion compensation.

Referring to FIG. 5, an optical communication system 500 includes data sources 502 coupled to optical transceivers 504 that produce modulated optical beams at a plurality of different wavelengths. A multiplexer 506 outputs a combined beam to a first optical amplifier 508 and the amplified beam is coupled to a dispersion compensation system 509 at a fiber input 509A. The power equalization and dispersion compensation system 509 includes a channeled optical filter 512 that can provide wavelength independent dispersion compensation and power equalization as discussed above. Dispersion for each wavelength in the combined amplified optical beam is set based on drive signals produced by a controller 514 and a dispersion compensated combined optical beam is coupled via a fiber output 509B to a second optical amplifier 516. A portion of the dispersion compensated combined optical beam is directed by a fiber coupler 518 to a 2:1 switch 520 and another portion is directed along a fiber link 520 to a transmitter output (TX) 522. Typically, dispersion compensation is applied to compensate for dispersion in the fiber link 520, but dispersion compensation values can be selected in other ways. A wavelength monitor 532 is coupled to the 2:1 switch and can measure channel wavelengths and channel powers to confirm spacings or to permit the channeled optical filter to independently adjust channel optical power.

For a CD dispersion compensation $D(\lambda_i)$ to be applied to an $i^{th}$ channel, an associated phase profile can be determined as $$\phi_{CD}(\lambda) = -\pi c \lambda_i^2 D(\lambda_i)\left(\frac{1}{\lambda} - \frac{1}{\lambda_i}\right)^2.$$

Such phase profiles are established on the channeled optical filter 512 for some or all channels at the associated LC elements A receiver input (RX) 524 is coupled to receive an incoming combined modulated optical beam and direct the combined modulated optical beam to a fiber splitter 526 that directs a beam portion to the 2:1 switch 520 and another beam portion to a receiver-side optical amplifier 528 and then to the multiplexer 506 that directs beam portions at various beam wavelengths to associated transceivers of the set of transceivers 504. A supervisory controller 530 is coupled communicate between transmitters and remote receivers so as to perform dispersion compensation, verify suitable wavelength (i.e., channel) spacings, determine channel powers, or perform other functions. As shown in FIG. 5, outgoing and incoming optical beams are communicated on different optical fibers, but both can be combined on a single fiber.

Figure 6:
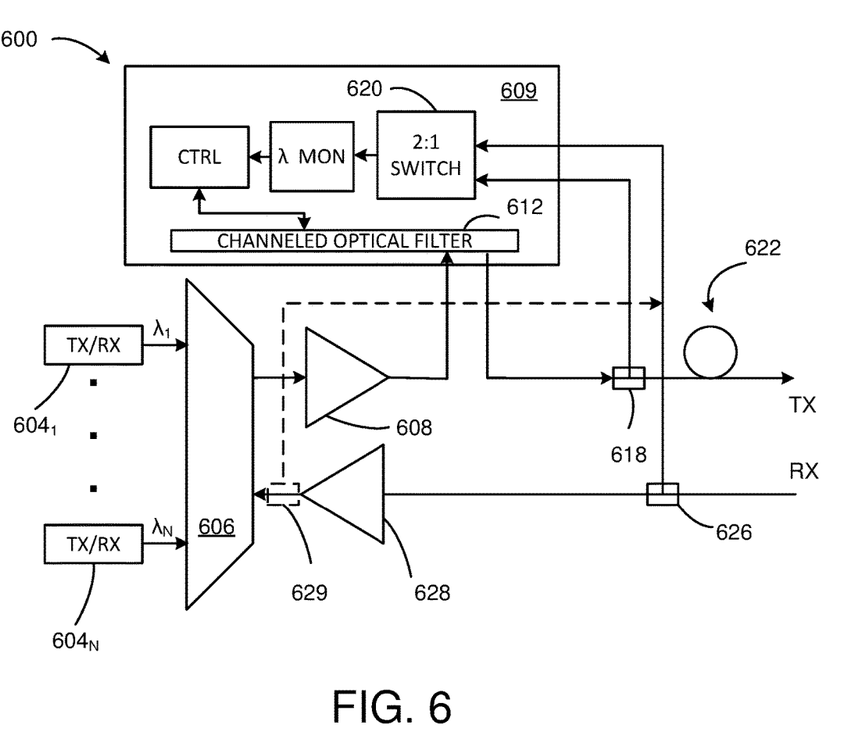
FIG. 6 illustrates a representative optical communication system that includes channeled CD compensation.

Referring to FIG. 6, an optical communication system 600 includes optical transceivers $604_1, \ldots, 604_N$ that produce modulated optical beams at N different wavelengths, wherein N is a positive integer. A multiplexer 606 outputs a combined beam to an optical amplifier 608 and the amplified beam is coupled to a dispersion compensation system 609. The dispersion compensation system 609 includes a channeled optical filter 612 such as discussed above. Dispersion for each wavelength in the combined amplified optical beam is applied and a dispersion compensated combined optical beam is coupled to fiber coupler 618 so that beam portions are directed to a 2:1 switch 620 and along a fiber link 622. Typically, dispersion compensation is applied to compensate for dispersion in the fiber link 622, but dispersion compensation values can be selected in other ways.

A receiver input (RX) is coupled to receive an incoming combined modulated optical beam and direct the combined modulated optical beam to a fiber splitter 626 that directs a beam portion to the 2:1 switch 620 and another beam portion to an receiver-side optical amplifier 628 and then to the multiplexer 606 that directs beam portions at various beam wavelengths to respective transceivers $604_1, \ldots, 604_N$. As shown in FIG. 6, outgoing and incoming optical beams are communicated on different optical fibers, but both can be combined on a single fiber. In some examples, a fiber coupler 629 is connected to an output of the optical amplifier 628 to direct a beam portion to the 2:1 switch 620 instead of or in addition to the fiber coupler 626. In this way, the amplified received beam can be monitored.

Figure 7:
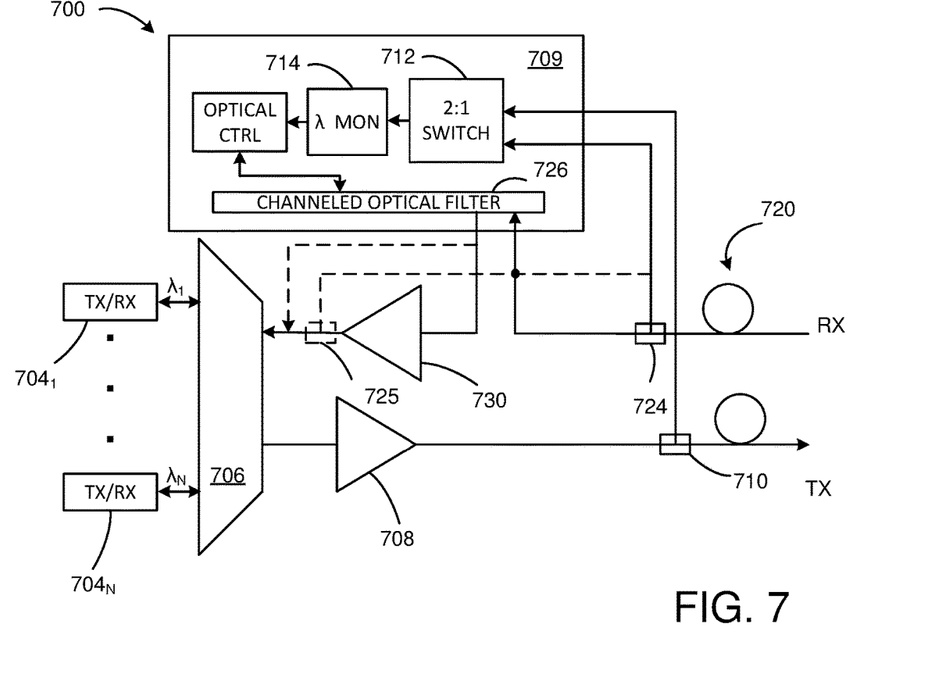
FIG. 7 illustrates a representative optical communication system that includes channeled CD compensation applied to incoming optical beams.

In another example system 700 shown in FIG. 7, dispersion compensation is applied to incoming optical signals, after transmission along a fiber link. As shown in FIG. 7, optical transceivers $704_1, \ldots, 704_N$ are coupled to a multiplexer 706 and a combined beam based on the modulated beams produced by optical transceivers $704_1, \ldots, 704_N$ is coupled to an optical amplifier 708. A portion of the amplified combined beam is directed by a fiber coupler 710 to an optical switch of a dispersion compensation system 709. This transmitter-side beam portion can be coupled to an optical monitor 714 to verify channel wavelength or determine optical power. In some examples, channel wavelength as determined by the optical monitor 714 is used to adjust transmitter wavelength by, for example, temperature tuning a transmitter laser. In other examples, then optical monitor 714 determines channel optical power that can then be raised or lowered as preferred.

A fiber link 720 receives a combined (multi-channel) beam from a remote transmitter and beam portions are directed to the 2:1 switch 712 and a channeled optical filter 726 that is controlled so apply suitable dispersion compensations. The dispersion compensated beam is then coupled to an optical amplifier 730 and the demultiplexer 706 so that each of the transceivers $704_1, \ldots, 704_N$ received corresponding modulated (and individually dispersion compensated) beams at appropriate wavelengths. Although not shown in FIG. 7, optical signal transmission and reception can be conducted on a single fiber and not on separate fibers as illustrated.

A fiber coupler such as the fiber coupler 724 can be situated at other locations in the optical path as well. For example, a fiber coupler 725 can be coupled to receive the output of the optical amplifier 730 and deliver a beam portion to the 2:1 switch 712. In addition, the fiber coupler 725 can deliver the combined beam, after amplification, to the channeled optical filter 726 so that CD compensation and power equalization are applied to the amplified combined beam. In other examples, CD compensation and power equalization are applied at an intermediate location in a fiber span.

Although some of the disclosed systems, such as the system 700, use amplifiers on transmit and/or receive lines, further embodiments operate without an amplifier on the transmit line, the receive line, or both. For example, amplifiers may not be needed in short-reach applications.

Figure 8:
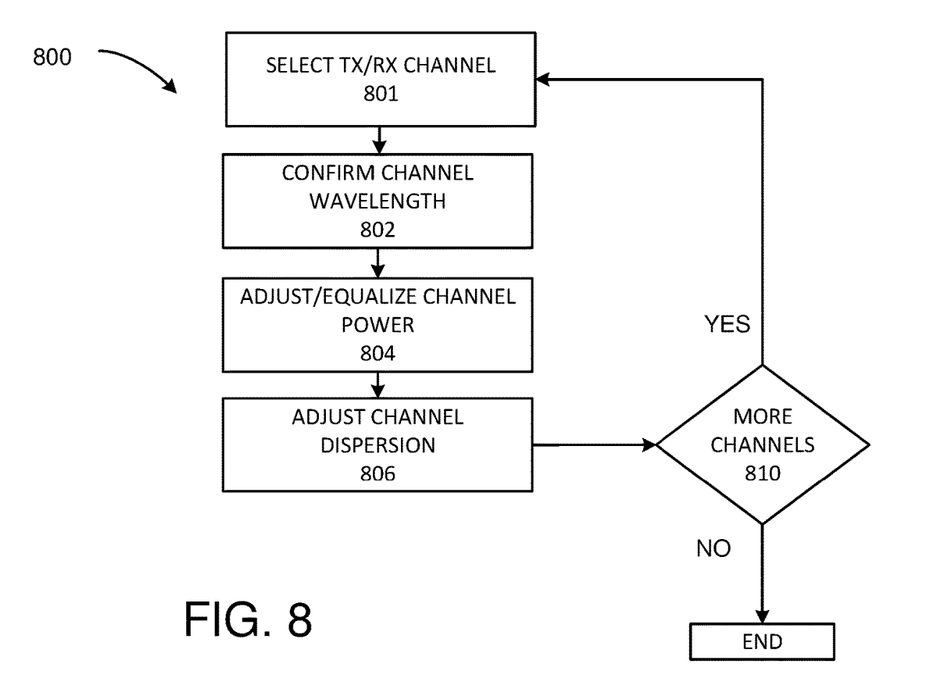
FIG. 8 illustrates a representative method of CD dispersion compensating a combined optical beam associated with a plurality of wavelength multiplexed channels.

Referring to FIG. 8, a method 800 includes selecting a particular channel (TX/RX wavelength) for compensation. At 802, a portion of the optical beam from the selected channel is evaluated to verify channel wavelength and optical power level. If necessary, channel wavelength can be tuned by temperature tuning a laser used by the selected channel, or wavelength can be communicated or otherwise evaluated to verify that there are no channel conflicts, i.e., no other channels are operating in the same channel bandwidth. At 804, channel power is adjusted or equalized.

At 806, channel dispersion is adjusted. Adjustments can be based on an applied dispersion compensations that produces a low or lowest bit error rate at a receiver, suitably open modulation eye diagrams, or a minimum or suitable single pulse temporal spreading. At 810, it is determined if additional channels are to be evaluated or compensated, and, if so, another channel is selected at 801. If not, dispersion compensation is complete.

Figure 9:
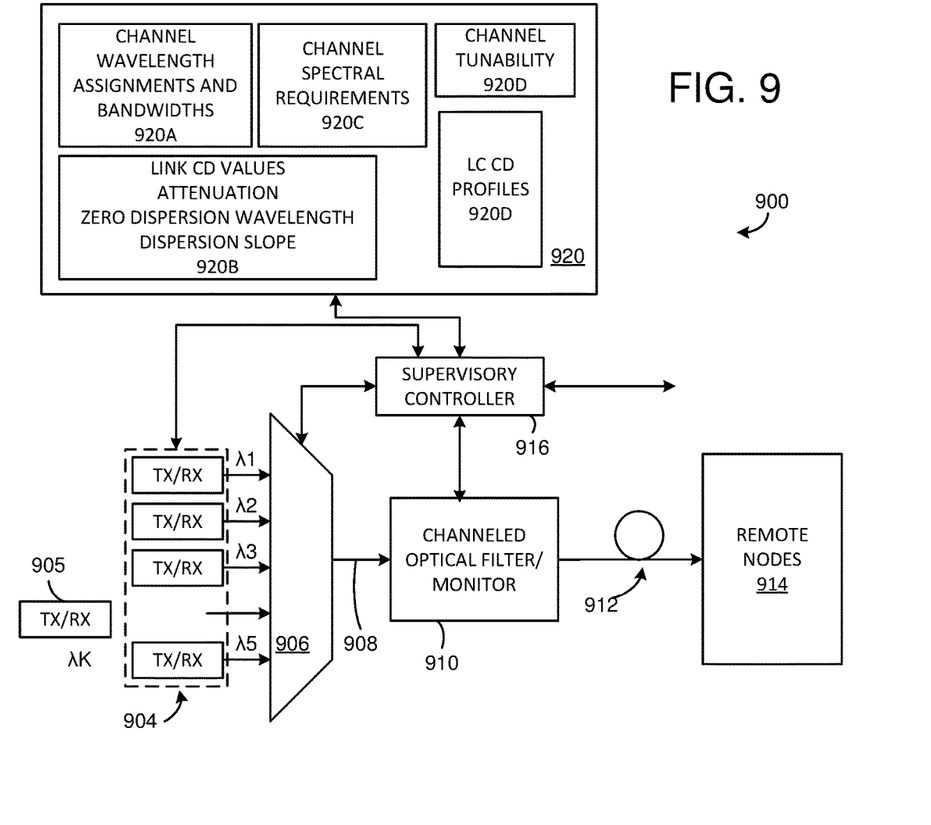
FIG. 9 illustrates an optical communication network that implements programmable CD compensation and channel monitoring.

FIG. 9 illustrates an optical communication network 900 that implements programmable CD compensation and channel monitoring. A plurality of transceivers 904 is coupled to an optical multiplexer 906 that combines modulated channel optical signals on an optical fiber 908 and couples the combined signals to a channeled optical filter/monitor 910. A CD compensated, channel equalized combined beam is coupled to a fiber link 912 and to a plurality of network nodes 914, typically via one or more optical amplifiers, demultiplexers, and transceivers that are not shown. The channeled optical filter/monitor 910 applies CD compensation independently to each channel, and also monitors each channel to determine channel wavelength and channel power. The channeled CD compensator/monitor 910 also equalizes or otherwise adjusts power in one or more channels in response to measured channel power. Typically, channel powers and per channel CD compensation are established by the channeled optical filter/monitor 910 as controlled by a supervisory controller 916 that can be implemented as a special purpose or general purpose processor having executable instructions that select CD profiles or channel powers (phase or amplitude modulations to be applied by individual or sets of modulator elements). Such instructions and communication system values and specifications are stored in a memory 920 such as RAM, ROM, a hard disk or other remote or local memory storage device or devices. In the example of FIG. 9, channel wavelength assignments and/or measured channel wavelengths for the plurality of transceivers 904 are stored in as memory portion 920A. In some cases, measured channel bandwidths are also stored for these transceivers. In addition, channel spectral requirements such as suitable wavelength ranges and channel spacings can be stored in a memory portion 920C. In some cases, characteristics of the fiber link 912 are stored as well in a memory portion 920B, and the supervisory controller 916 can determine CD compensation values using channel wavelength without additional measurements. Typical fiber link parameters can include zero dispersion wavelength, dispersion slope, and fiber loss. In addition, channel tuning parameters such as channel wavelength tuning based on, for example, transmitter laser temperatures, can be stored in a memory portion 920D.

The channeled optical filter/monitor 910 permits a replacement or an additional transceiver 905 (i.e., replacement of a channel component or addition of a channel) to be CD compensated and equalized. With the transceiver 905 activated, the channeled optical filter/monitor 910 measures channel wavelength and optical power and communicates measured values to the controller 916. If the channel wavelength is unsuitable based on existing channel assignments and required channel separations, the processor 916 can report unsuitability or determine if the channel wavelength associated with the transceiver can be tuned to become acceptable. If the channel wavelength of the transceiver 905 is suitable, the controller 916 then communicates a preferred amount of dispersion compensation to be applied by the channeled optical filter/monitor 910. This can be estimated by determining a dispersion compensation that produces an acceptable or lowest bit error rate or eye diagram opening. Alternatively, the controller 916 can select dispersion compensation values using stored values for the fiber link 914 or based on dispersion compensation values used for some or all transceivers of the plurality of transceivers 904.

Figure 10:
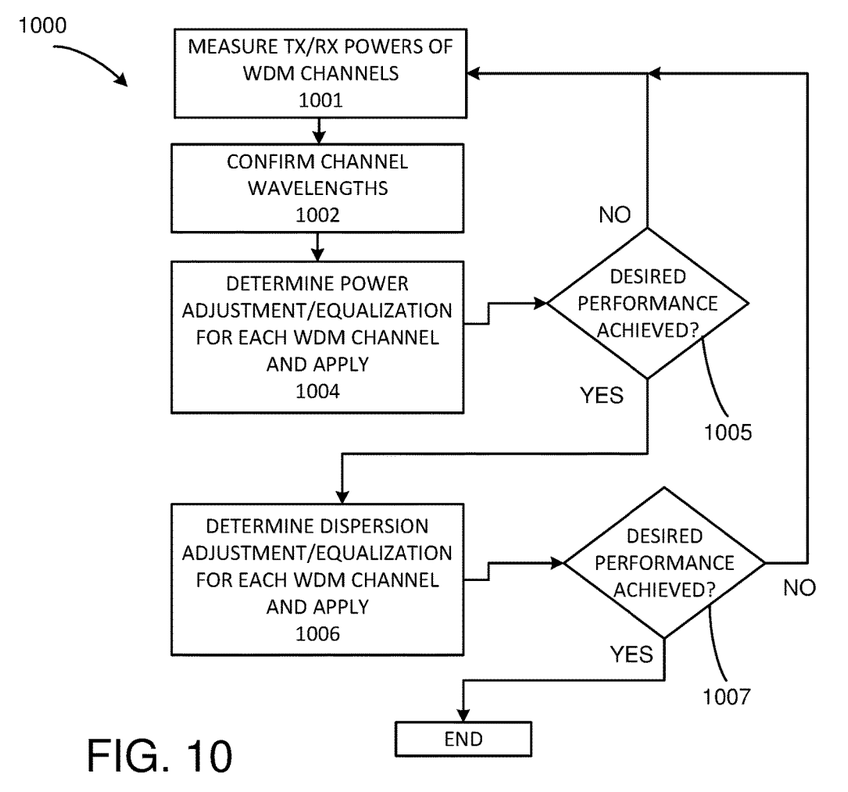
FIG. 10 illustrates another representative method of CD dispersion compensating and power equalizing a combined optical beam associated with a plurality of wavelength multiplexed channels.

Referring to FIG. 10, a method 1000 includes measuring transmit and/or receive powers for a plurality of DWDM channels at 1001. At 1002, channel wavelengths are verified and at 1004, power adjustments/equalizations for each wavelength channel are determined and applied. At 1005, it is determined if performance targets have been met by the power adjustments. If not, processing returns to 1001. If performance is acceptable, at 1006, dispersion compensations for each channel are determined and applied. At 1007, it is determined if performance targets have been met by the dispersion compensations. If not, processing returns to 1001 (or to 1002 or to 1004). If targets are met, compensation procedures can terminate. In various embodiments of the method 1000, power adjustments 1004 and dispersion adjustments 1006 can be performed together or in reverse order as well as in the order shown in FIG. 10.

In some cases, channel losses as a function of wavelength can be compensated by suitable adjustment of optical power levels in one or more channels, or power differences such as spectral tilts can be compensated. Optical amplifier gain as a function of wavelength can be compensated as well.

It should also be well understood that any processor (controller) functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

In view of the many possible embodiments to which the principles of the disclosed technology may be applied, it should be recognized that the illustrated embodiments are only representative examples and should not be taken as limiting the scope of the disclosure. Alternatives specifically addressed in these sections are merely exemplary and do not constitute all possible alternatives to the embodiments described herein. For instance, various components of systems described herein may be combined in function and use. We therefore claim as our invention all that comes within the scope and spirit of the appended claims.

What is claimed is:

1. A transmitter system for optical fiber communications, comprising:
    a plurality of optical transmitters that produce modulated optical beams at respective wavelengths;
    a fiber optic multiplexer optically coupled to each of the optical transmitters so as to receive the modulated optical beams from each of the plurality of optical transmitters and produce a combined optical output beam;
    a channeled dispersion compensation system comprising an optical switch and a channeled dispersion compensator coupled to the fiber optical multiplexer, wherein the optical switch selects the combined optical output beam or a combined optical input beam comprising modulated optical beams at the respective wavelengths, wherein the channeled dispersion compensator is situated to apply an individually selectable chromatic dispersion compensation to each of the modulated optical beams at the respective wavelengths in the selected optical beam, and produce a combined, dispersion-compensated and power equalized optical beam; and
    a processor coupled to the channeled dispersion compensator and operable to select the individually selectable chromatic dispersion compensations associated with the selected optical beam.

2. The transmitter system of claim 1, further comprising an optical amplifier coupled to receive the combined optical output beam from the fiber optical multiplexer and deliver the combined optical output beam to the channeled dispersion compensator.

3. The transmitter system of claim 1, wherein the channeled dispersion compensator includes a grating and a liquid crystal array on a silicon substrate, wherein the grating is coupled to receive the selected optical beam and direct beam portions at the respective wavelengths to corresponding elements of the liquid crystal array.

4. The transmitter system of claim 3, wherein the processor applies dispersion compensations based on one or both of channel bit error rates or inter-symbol interference.

5. A dispersion compensation system for optical communications, comprising:
an optical switch coupled to select an input beam that comprises optical beams at each of a plurality of wavelengths or an output beam that comprises optical beams at each of the plurality of wavelengths;
a channeled dispersion compensator that applies individually selectable dispersions to each of the plurality of wavelengths in the selected optical beam;
a processor coupled to the channeled dispersion compensator so as to select a preferred dispersion compensation for the optical beams at each of the plurality of wavelengths in the selected optical beam, wherein the channeled dispersion compensator applies dispersion compensations to the optical beams at each of the plurality of wavelengths.

6. The dispersion compensation system of claim 5, wherein
the preferred dispersion compensation for each of the optical beams is based on bit error rate or inter-symbol interference.

7. The dispersion compensation system of claim 5, wherein the channeled dispersion compensator includes a grating and a liquid crystal modulator array, wherein the grating is coupled to receive the selected optical beam and direct beam portions at respective wavelengths of the plurality of wavelengths to corresponding sets of elements of the liquid crystal modulator array, wherein the processor is coupled to the sets of elements so as to select one or more dispersion compensations at each of the plurality of wavelengths.

8. The dispersion compensation system of claim 7, wherein the processor is coupled to the sets of elements of the liquid crystal modulator array to establish optical beam powers at each of the plurality of wavelengths so as to select a preferred optical power for the optical beams at each of the plurality of wavelengths in the selected optical beam.

9. The dispersion compensation system of claim 7, further comprising an optical multiplexer having a plurality of multiplexer inputs and a multiplexer output, wherein the multiplexer output is optically coupled to the channeled dispersion compensator.

10. The dispersion compensation system of claim 7, further comprising an optical multiplexer having a plurality of multiplexer inputs and a multiplexer output and an optical amplifier, wherein the multiplexer output is optically coupled to the optical amplifier and the optical amplifier is optically coupled to the channel dispersion compensator.

11. The dispersion compensation system of claim 7, wherein the channeled dispersion compensator includes an optical fiber situated to receive the input beam and deliver an output beam that is dispersion compensated at each of the plurality of wavelengths.

12. The dispersion compensation system of claim 5, wherein the processor selects a preferred optical power for the optical beams in the selected optical beam at each of the plurality of wavelengths so as to establish a power equalized and dispersion compensated combined optical beam.

13. An optical communication network, comprising:
a plurality of transceivers that produce corresponding modulated optical beams, wherein each transceiver has an associated channel wavelength;
an optical multiplexer coupled to the plurality of transceivers so as to couple the modulated optical beams from the plurality of transceivers to a single optical fiber as a combined transmitted beam;
a wavelength monitor;
an optical switch that selects one of the combined transmitted beam or a combined received beam comprising modulated optical beams at the associated channel wavelengths and couples a portion of the selected optical beam to the wavelength monitor;
a processor coupled to the wavelength monitor and configured to select at least one preferred dispersion compensation for the selected optical beam; and
a channeled chromatic dispersion (CD) compensator coupled to receive the selected optical beam and independently CD compensate portions of the selected optical beam corresponding to each of the modulated optical beams and produce a CD compensated combined optical beam based on the preferred dispersion compensation.

14. The optical communication network of claim 13, further comprising an optical amplifier situated to receive the combined transmitted beam or the combined received beam and direct a corresponding amplified combined beam to the channeled CD compensator.

15. The optical communication network of claim 13, wherein the channeled CD compensator independently adjusts optical powers in the selected optical beam corresponding to each of the modulated optical beams so as to produce a CD compensated, power equalized combined optical beam.

16. The optical communication network of claim 13, further comprising a first optical amplifier and a second optical amplifier, wherein the first optical amplifier is situated to receive the combined transmitted beam and direct an amplified combined beam to the channeled CD compensator, and the second optical amplifier is situated to receive the CD compensated amplified combined beam from the channeled CD compensator.

17. The optical communication network of claim 13, wherein the selected optical beam is the combined transmitted beam so that the CD compensated combined optical beam is a transmitted CD compensated combined optical beam, further comprising an optical fiber link situated to deliver the transmitted CD compensated combined optical beam to remote receivers.

18. The optical communication network of claim 13, wherein the channeled CD compensator independently compensates the portions of the selected optical beam corresponding to each of the channel wavelengths based on a bit error rate or intersymbol interference associated with each of the portions.

19. The optical communication network of claim 13, further comprising a channel control processor coupled to the channeled CD compensator, the channel control processor determining chromatic dispersions associated with each of the channel wavelengths in the selected optical beam based on beam wavelength, beam spectral width, fiber link length, fiber properties, fiber chromatic dispersion or dispersion slope, wherein the channeled CD compensator applies dispersion compensations corresponding to the determined chromatic dispersions.

20. The optical communication network of claim 19, wherein the channeled CD compensator includes an array of liquid crystal optical modulator elements, and dispersion compensations are associated with corresponding optical modulations provided by different sets of liquid crystal optical modulator elements.

21. The optical communication network of claim 19, wherein the channeled CD compensator includes a diffraction grating or an arrayed waveguide grating situated to receive the selected optical beam and direct the selected optical beam to respective sets of liquid crystal optical modulator elements.

22. The optical communication network of claim 13, further comprising an optical power monitor that measures optical power at each of the channel wavelengths associated with the selected optical beam, the optical power monitor coupled to the CD compensator so that the CD compensator establishes optical powers at each of the channel wavelengths.

\* \* \* \* \*